United States Patent
Perng

(10) Patent No.: US 8,135,984 B2
(45) Date of Patent: Mar. 13, 2012

(54) SYSTEM AND METHOD FOR RECONSTRUCTING RAID SYSTEM

(75) Inventor: Shin-Yao Perng, Hsinchu (TW)

(73) Assignee: Mitac Technology Corp., Hsinchu (TW)

( * ) Notice: Subject to any disclaimer, the term of this patent is extended or adjusted under 35 U.S.C. 154(b) by 253 days.

(21) Appl. No.: 12/266,515

(22) Filed: Nov. 6, 2008

(65) Prior Publication Data

US 2010/0115331 A1    May 6, 2010

(51) Int. Cl.
*G06F 11/00* (2006.01)
(52) U.S. Cl. ..................... 714/6.24; 714/6.22
(58) Field of Classification Search .................. 714/5
See application file for complete search history.

(56) References Cited

U.S. PATENT DOCUMENTS

| | | | | |
|---|---|---|---|---|
| 5,805,788 A * | 9/1998 | Johnson | ............................. | 714/6 |
| 6,195,767 B1 * | 2/2001 | Adams | ............................. | 714/47 |
| 6,516,425 B1 * | 2/2003 | Belhadj et al. | ..................... | 714/6 |
| 6,952,794 B2 * | 10/2005 | Lu | ...................................... | 714/7 |
| 7,401,253 B2 * | 7/2008 | Winarski et al. | .................. | 714/8 |
| 2003/0237019 A1 * | 12/2003 | Kleiman et al. | ................... | 714/6 |
| 2006/0161753 A1 * | 7/2006 | Aschoff et al. | ............... | 711/170 |
| 2006/0253766 A1 * | 11/2006 | Winarski et al. | ............. | 714/755 |
| 2007/0157002 A1 * | 7/2007 | Zelikov et al. | ................ | 711/202 |
| 2007/0174662 A1 * | 7/2007 | Zelikov et al. | .................... | 714/5 |
| 2009/0271659 A1 * | 10/2009 | Troppens et al. | ................. | 714/7 |

* cited by examiner

*Primary Examiner* — Scott Baderman
*Assistant Examiner* — Kamini Patel
(74) *Attorney, Agent, or Firm* — Apex Juris, pllc; Tracy M Heims

(57) ABSTRACT

A method for reconstructing a RAID system is disclosed. Plural disks are corresponded to plural pieces of unique recognition data, where each disk corresponds to one of the recognition data. A disk profile is generated according to the recognition data using a RAID system, wherein the disk profile comprises a logic section combined with the disks and the logic section respectively corresponds to the recognition data of different disks based on stored data in different disks. The disks are mounted to a computer device providing the RAID system. The mounted disks are mapped to correct disk mount addresses according to the disk profile to reconstruct the stored data of the disks in the computer device.

10 Claims, 8 Drawing Sheets

SYSTEM AND METHOD FOR RECONSTRUCTING RAID SYSTEM

BACKGROUND OF THE INVENTION

1. Field of the Invention

The invention relates to a Redundant Array of Independent Disks (RAID) system, and more particularly to a system and method for reconstructing a RAID system.

2. Description of the Related Art

A RAID system is composed of multiple disks (for example, hard disks) with series or parallel connections that generates a tolerance (intolerance) array system to form a large virtual disk, thus increasing access speed, enhancing data security, and providing disk tolerance function.

The RAID systems comprise RAID-0, RAID-1, RAID-2, RAID-3, RAID-4, RAID-5, and RAID-6 systems. The RAID-5 is also a rotating parity array, an array system comprising at least more than 3 disks (for example, hard disks). The RAID-5 system is applicable that system load can be distributed to multiple disks so that data still can be recombined to keep the data integrity while one of the disks is damaged.

As described, in a host comprising the RAID-5 system, when one of the disks is damaged, the damaged disk is replaced by a new disk and data in the damaged disk is recombined in the new disk. Additionally, each disk can be swapped only for one time and the swapped disk cannot be used in other RAID-5 systems. When the disks in the host are all removed from and installed in the host with different sequence, the RAID-5 system cannot determine the disk sequence so that data in the disks cannot be recombined.

Additionally, when three disks (for example, disks 1, 2, and 3) are installed in the RAID-5 system, if the disk 2 is removed from and inserted in the RAID-5 system, the RAID-5 system may recognize the disk 2 as a new disk (for example, disk 4). Further, when the disk 2 is removed from the RAID-5 system and a new disk (for example, disk 5) is inserted in the position where the disk 2 is originally installed, the RAID-5 system may recognize the disk 5 as the disk 2. Thus, the RAID-5 system performs a data recovery operation that data in the disk 5 is deleted and data in the disk 2 is recovered using data in the disks 1 and 3, resulting in data errors.

Thus, a method and system for reconstructing a RAID system is desirable.

BRIEF SUMMARY OF THE INVENTION

Methods for reconstructing a RAID system are provided. An exemplary embodiment of a method for reconstructing a RAID system comprises the following. Plural disks are corresponded to plural pieces of unique recognition data, where each disk corresponds to one of the recognition data. A disk profile is generated according to the recognition data using a RAID system, wherein the disk profile comprises a logic section combined with the disks and the logic section respectively corresponds to the recognition data of different disks based on stored data in different disks. The disks are mounted to a computer device providing the RAID system. The mounted disks are mapped to correct disk mount addresses according to the disk profile to reconstruct the stored data of the disks in the computer device.

Another embodiment of a method for reconstructing a RAID system comprises a correlating unit, a generation unit, and a reconstruction unit. The correlating unit correlates plural disks to plural pieces of unique recognition data, where each disk corresponds to one of the recognition data. The generation unit generates a disk profile according to the recognition data using a RAID system, wherein the disk profile comprises a logic section combined with the disks and the logic section respectively corresponds to the recognition data of different disks based on stored data in different disks. The reconstruction unit maps the mounted disks to correct disk mount addresses according to the disk profile to reconstruct the stored data of the disks in a computer device when mounting the disks to the computer device providing the RAID system.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1A:
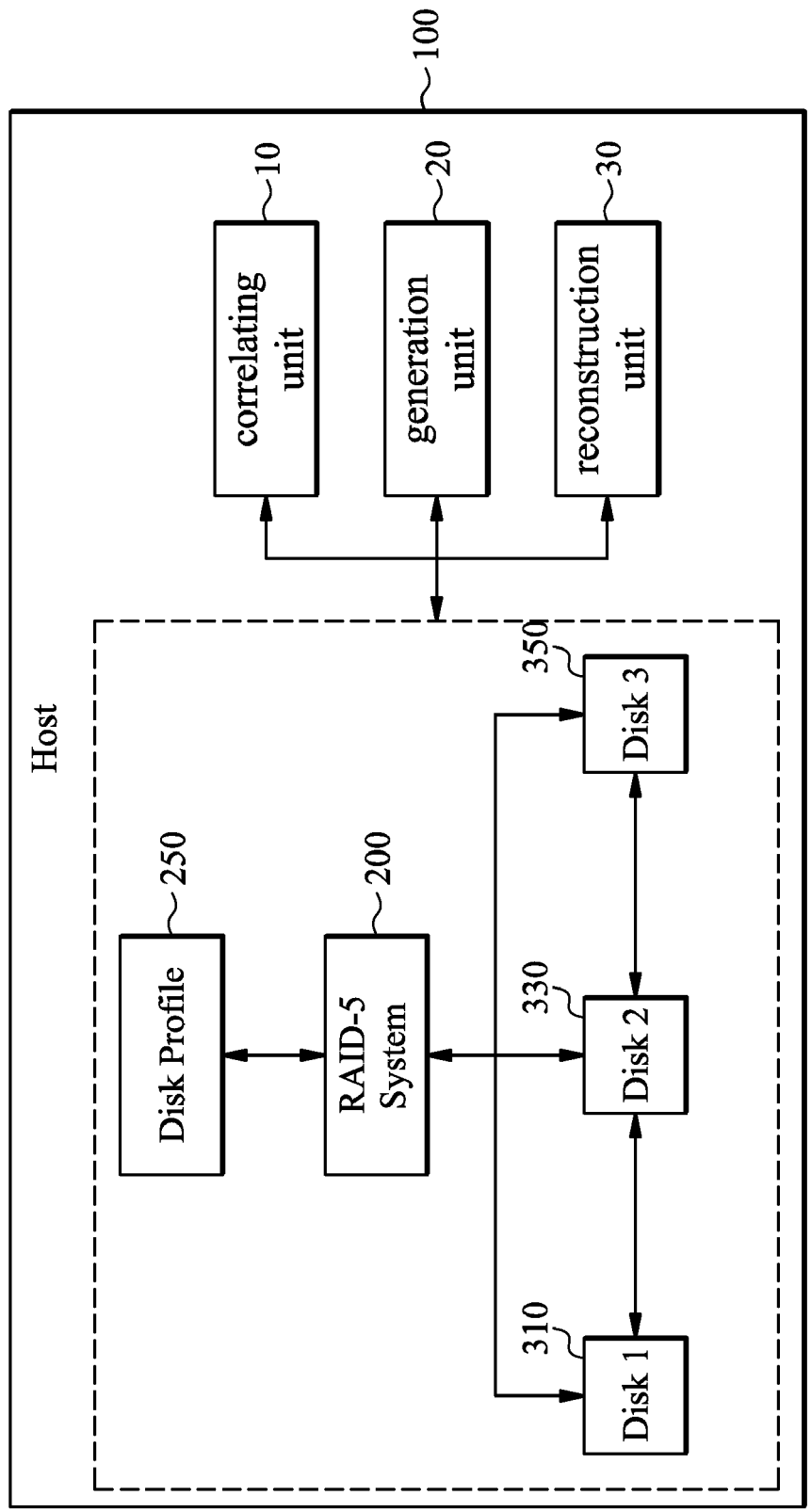
FIG. 1A is a schematic view of the first embodiment of a system for reconstructing a RAID system of the present invention.

Several exemplary embodiments of the invention are described with reference to FIGS. 1 through 5, which generally relate to reconstructing a RAID system. It is to be understood that the following disclosure provides various different embodiments as examples for implementing different features of the invention. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

Figure 1B:
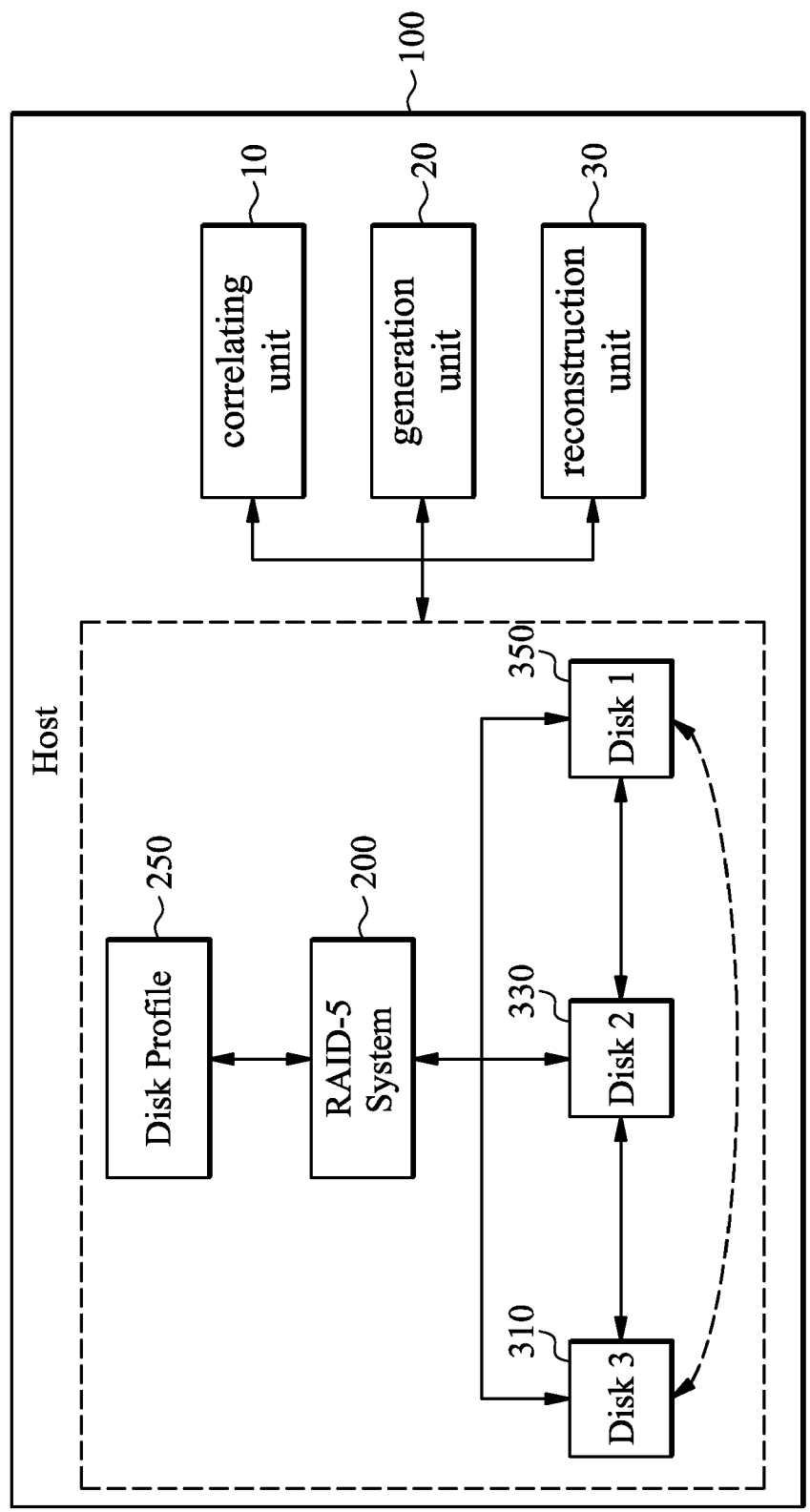
FIG. 1B is another schematic view of the first embodiment of a system for reconstructing a RAID system of the present invention.

FIG. 1A is a schematic view of the first embodiment of a system for reconstructing a RAID system of the present invention. FIG. 1B is another schematic view of the first embodiment of a system for reconstructing a RAID system of the present invention.

The system for reconstructing a RAID system of the first embodiment comprises a correlating unit 10, a generation unit 20, and a reconstruction unit 30. In the first embodiment, a computer device 100 (for example, a host) comprises a RAID-5 system 200 and plural disks 310, 330, and 350. The disks may be hard disks, flash memory devices or any storage devices. When the disks 310, 330, and 350 are mounted to the computer device 100, the correlating unit 10 enables the RAID-5 system 200 to recognize unique recognition data (such as disk serial numbers, disk mount addresses, product serial numbers, product types, and so on) of each disk. The generation unit 20 generates a disk profile 250 according to the recognition data using the RAID-5 system. The disk profile 250 comprises a logic section combined with the disks 310, 330, and 350.

When any one or more than one disks of the disks 310, 330, and 350 are removed from and mounted to the computer device 100 based on random disc sequences (as shown in FIG. 1B), the reconstruction unit 30 enables the RAID-5 system 200 to map the disks to correct disk mount addresses according to the recognition data of the disk profile 250 to recombine data of the disks 310, 330, and 350. It is noted that the reconstruction herein indicates that a mounted disk is mapped to a correct disk mount address of the RAID-5 system so the user can directly access or edit data stored in the mounted disk.

When the disks 310, 330, and 350 are removed from the computer device 100 and mounted to a new computer device (not shown), a reconstruction unit of the new computer device can enable a RAID-5 system of the new computer system to map the disks to correct disk mount addresses according to the disk profile stored in each of the disks 310, 330, and 350 to recombine data of the disks 310, 330, and 350 in the new computer device.

Figure 1C:
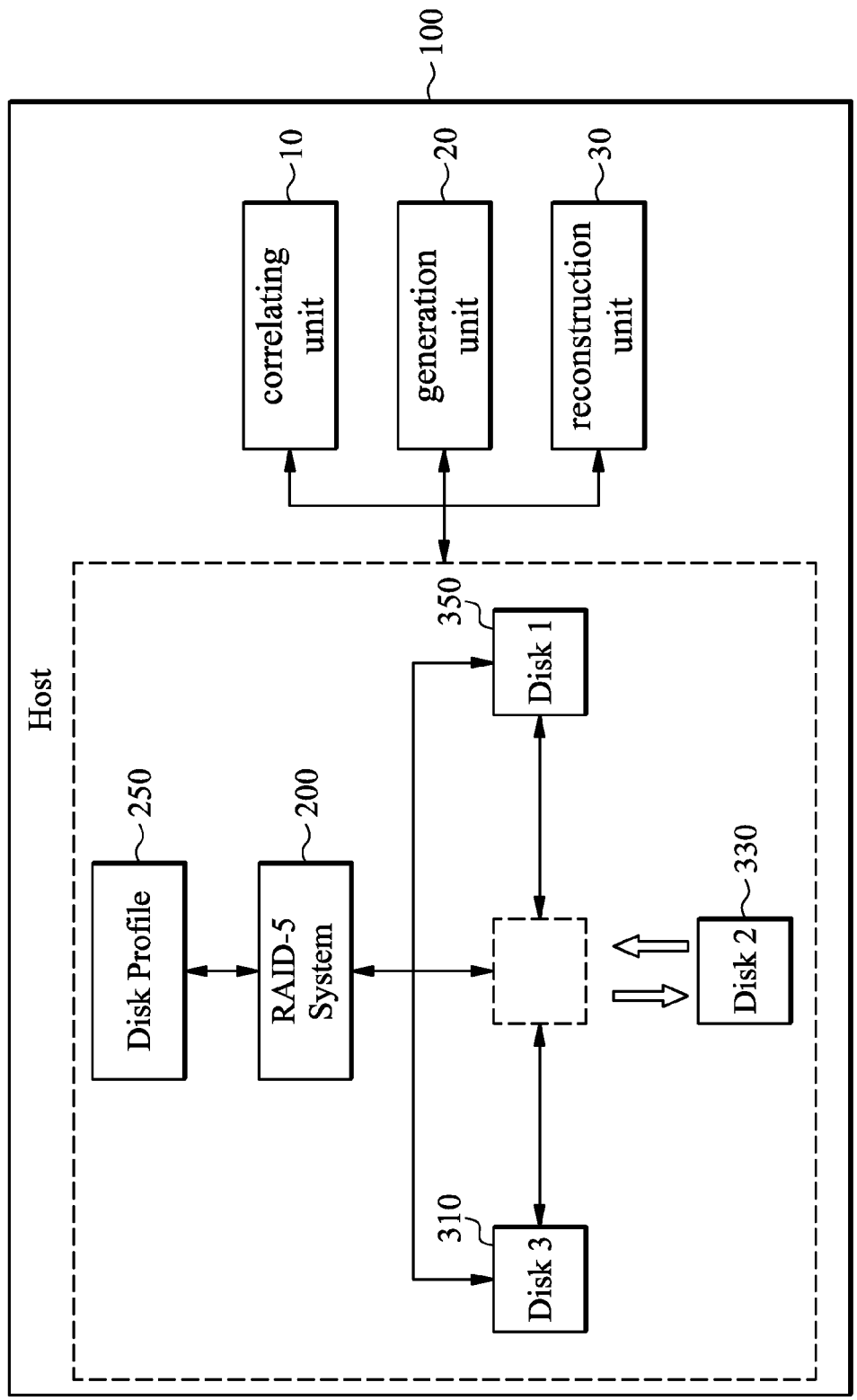
FIG. 1C is further another schematic view of the first embodiment of a system for reconstructing a RAID system of the present invention.

FIG. 1C is further another schematic view of the first embodiment of a system for reconstructing a RAID system of the present invention. When one of the disks (for example, the disk 330) is removed from and mounted to the computer device 100, the RAID-5 system of the computer device 100 recognizes the mounted disk as the disk 330 according to the recognition data of the disk profile 250, does not delete data stored in the disk 330, and recombines the data of the disk 330 so that data errors are not generated. Thus, consumed computer resources and time resulted from restoring removed disk data (i.e. data in disk 2 in the prior art) for the prior art can be saved.

Figure 1D:
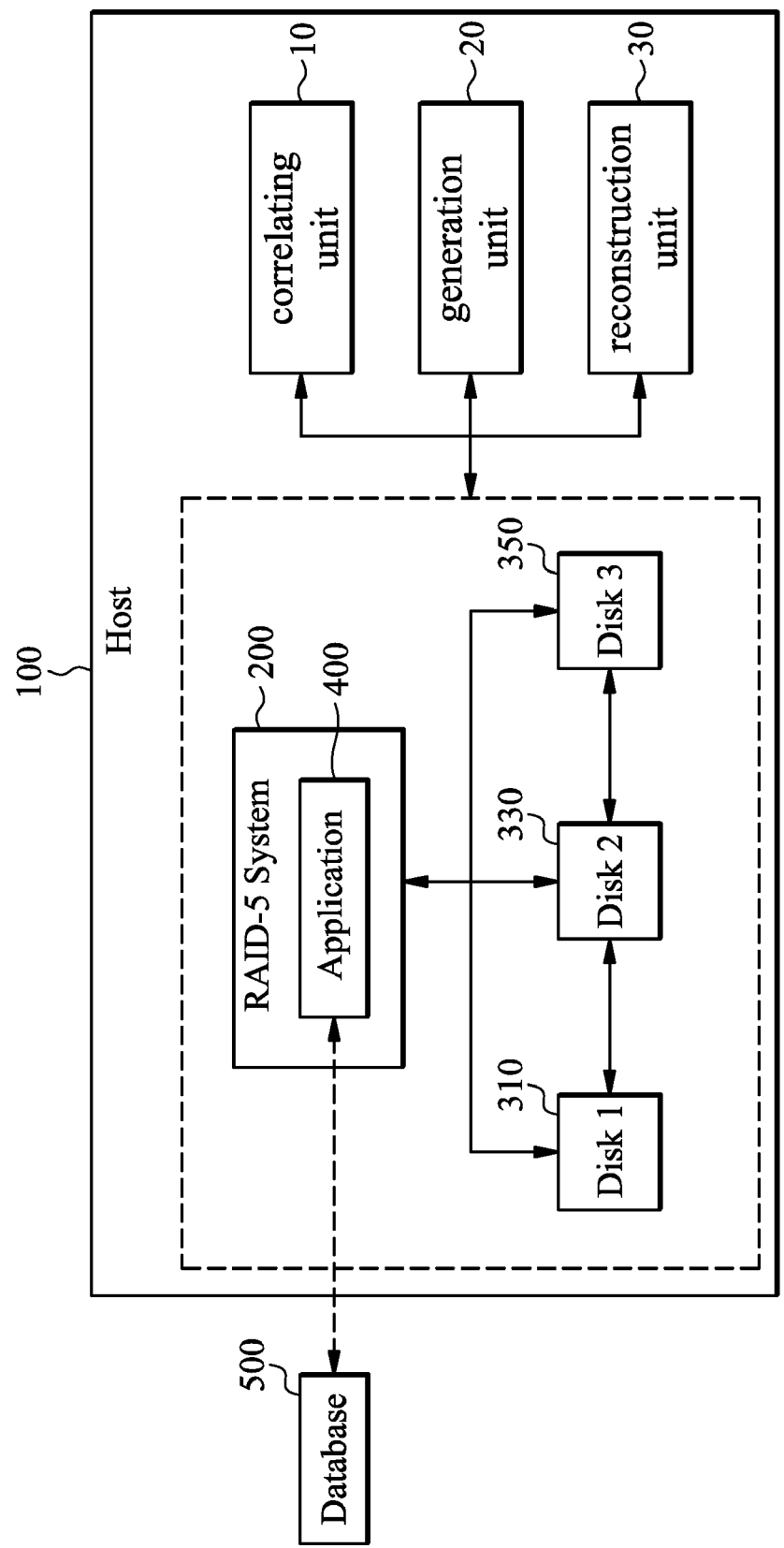
FIG. 1D is a schematic view of the second embodiment of a system for reconstructing a RAID system of the present invention.

FIG. 1D is a schematic view of the second embodiment of a system for reconstructing a RAID system of the present invention. The RAID-5 system further comprises an application 400 for corresponding to the correlating unit 10. The application 400 generates recognition data of each disk based on disk serial numbers, disk mount addresses, product serial numbers, product types or other recognizable features and writes the recognition data in the disks 310, 330, and 350. For example, recognition serial numbers of each of the disks 310, 330, and 350 are calculated using a code generator and are written in each of the disks. Additionally, the application 400, as shown in FIG. 1D, retrieves three recognition serial numbers from the unique recognition serial numbers stored in an external database 500 and respectively writes the three recognition serial numbers in each of the disk 310, 330, and 350.

Thus, when any one or more than one disks of the disks 310, 330, and 350 are removed from and mounted to the computer device 100 based on random disc sequences (as shown in FIGS. 1B and 1C), the RAID-5 system 200 maps the disks to correct disk mount addresses according to the recognition data or the recognition serial numbers of each disk to recombine the data of the disks 310, 330, and 350.

It is noted that the embodiments only describe mounting the disks 310, 330, and 350 to the original computer device 100 and, however, the disk profile 250 can be copied to another computer device providing a RAID-5 system. Thus, when the disks of the computer device 100 are randomly mounted to the new computer device, data of the disks 310, 330, and 350 can be reconstructed according to the copied disk profile using a RAID-5 system of the new computer device with implementing the described process in the embodiments.

Additionally, the disk profile is stored in a storage medium (for example, the Read Only Memory (ROM) storing Basic Input/Output System (BIOS)) of the computer device 100 or each of the mounted disks 310, 330, and 350.

Further, in addition to the RAID-5 system, RAID-1, RAID-2, RAID-3, RAID-4, RAID-6, RAID-10, and RAID-50 systems and other RAID systems can also be involved for implementation.

Figure 2:
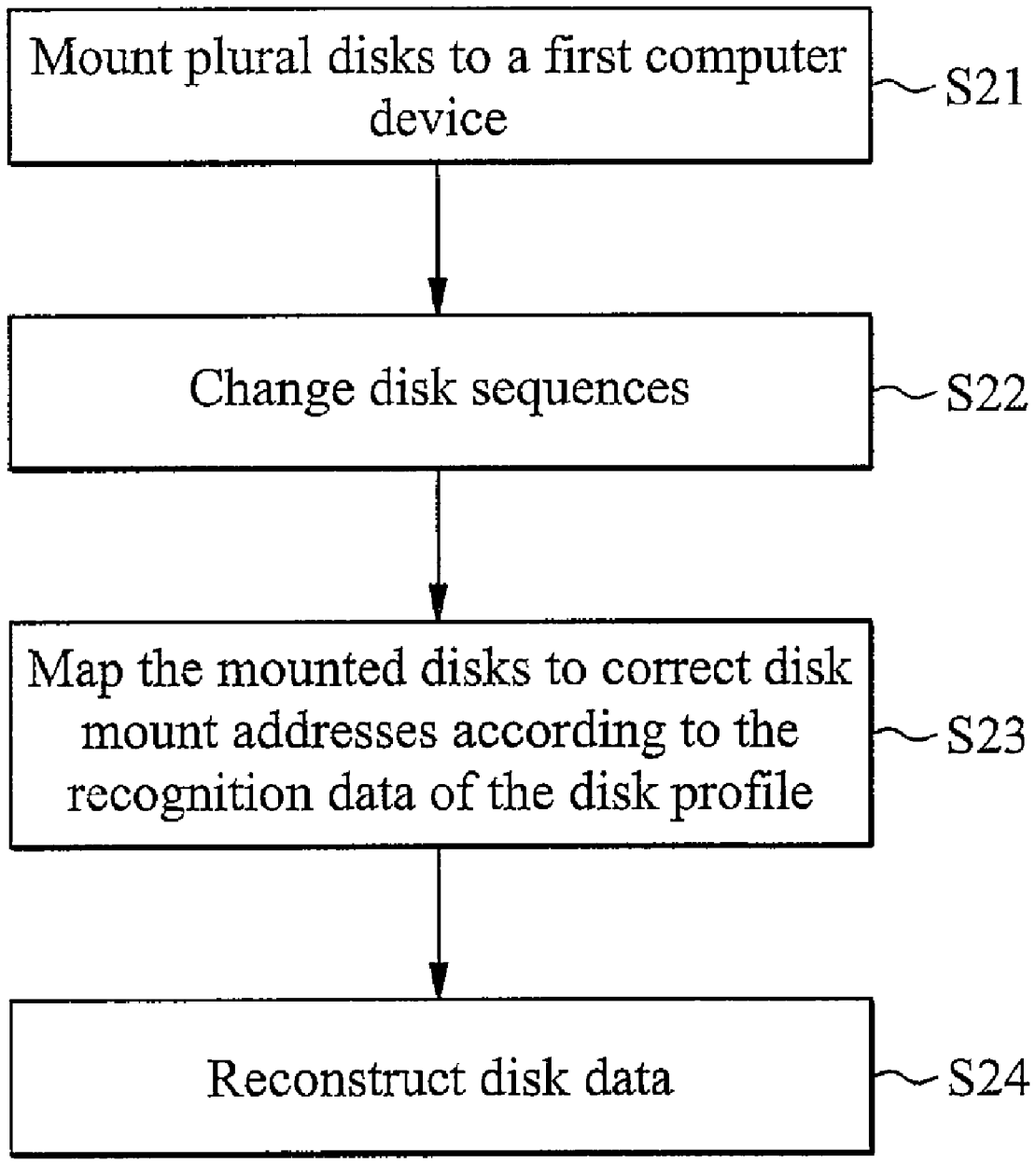
FIG. 2 is a flowchart of the third embodiment of a method for reconstructing a RAID system of the present invention.

FIG. 2 is a flowchart of the third embodiment of a method for reconstructing a RAID system of the present invention.

When initialized, plural disks (at least first, second, and third disks) are mounted to a first computer device, recognition data (comprising disk serial numbers) of each of the first, second, and the third disks is recognized by a first RAID-5 system of the first computer device to generate a disk profile (step S21). When any one or more than one of the first, second, and the third disks are removed from the first computer device and then the removed disks are mounted to the first computer device based on random disc sequences (as shown by the disks 310 and 350 in Fig. B) (step S22), the mounted disks are mapped to correct disk mount addresses according to the recognition data of the disk profile (step S23) to recombine data of the first, second, and the third disks using the first RAID-5 system (step S24).

Figure 3:
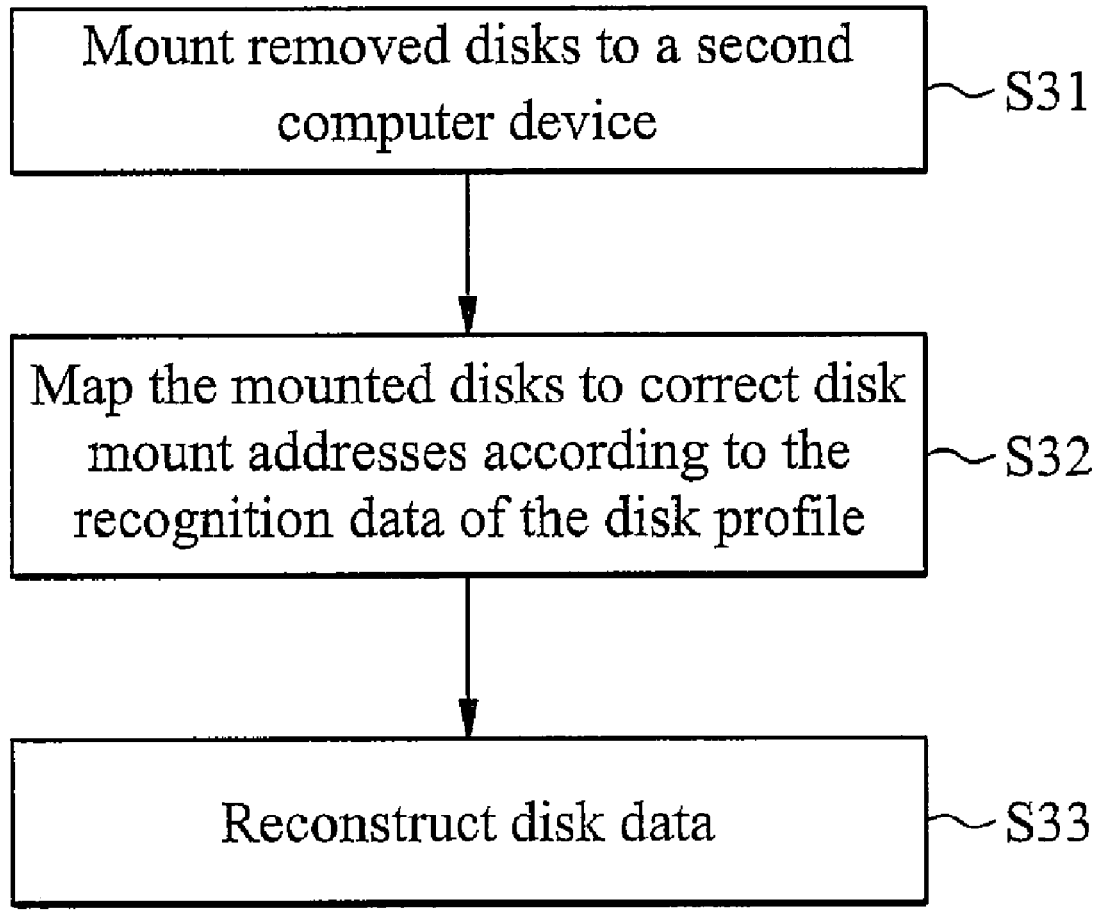
FIG. 3 is a flowchart of the fourth embodiment of a method for reconstructing a RAID system of the present invention.

FIG. 3 is a flowchart of the fourth embodiment of a method for reconstructing a RAID system of the present invention.

When the first, second, and third disks are removed from the first computer device and then mounted to a second computer device (not shown) based on random disc sequences (step S31), a second RAID-5 system of the second computer system maps the disks to correct disk mount addresses according to the recognition data of the disk profile stored in the first, second, and third disks (step S32) to recombine data of all the disks in the second computer system (step S33).

Figure 4:
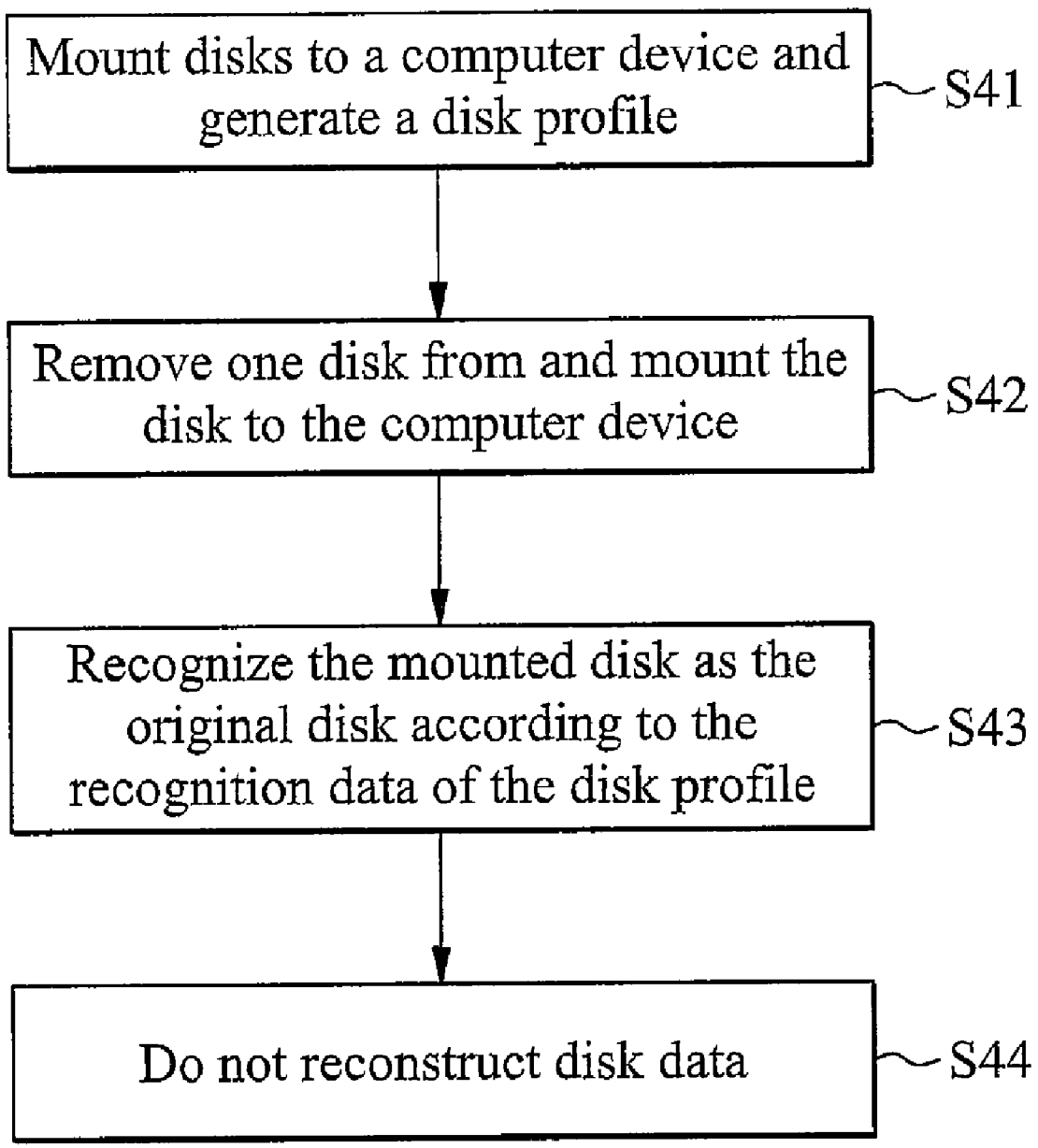
FIG. 4 is a flowchart of the fifth embodiment of a method for reconstructing a RAID system of the present invention.

FIG. 4 is a flowchart of the fifth embodiment of a method for reconstructing a RAID system of the present invention.

When initialized, at least first, second, and third disks are mounted to a computer device, recognition data (comprising disk serial numbers) of each of the first, second, and the third disks is recognized by an application of a RAID-5 system of the computer device to generate a disk profile (step S41). When the second disk is removed from and then mounted to the computer device (as shown by the disk 330 in Fig. C) (step S42), the mounted disk is recognized as the second disk by the application according to the recognition data of the disk profile (step S43) so that the RAID-5 system does nothing (step S44).

Figure 5:
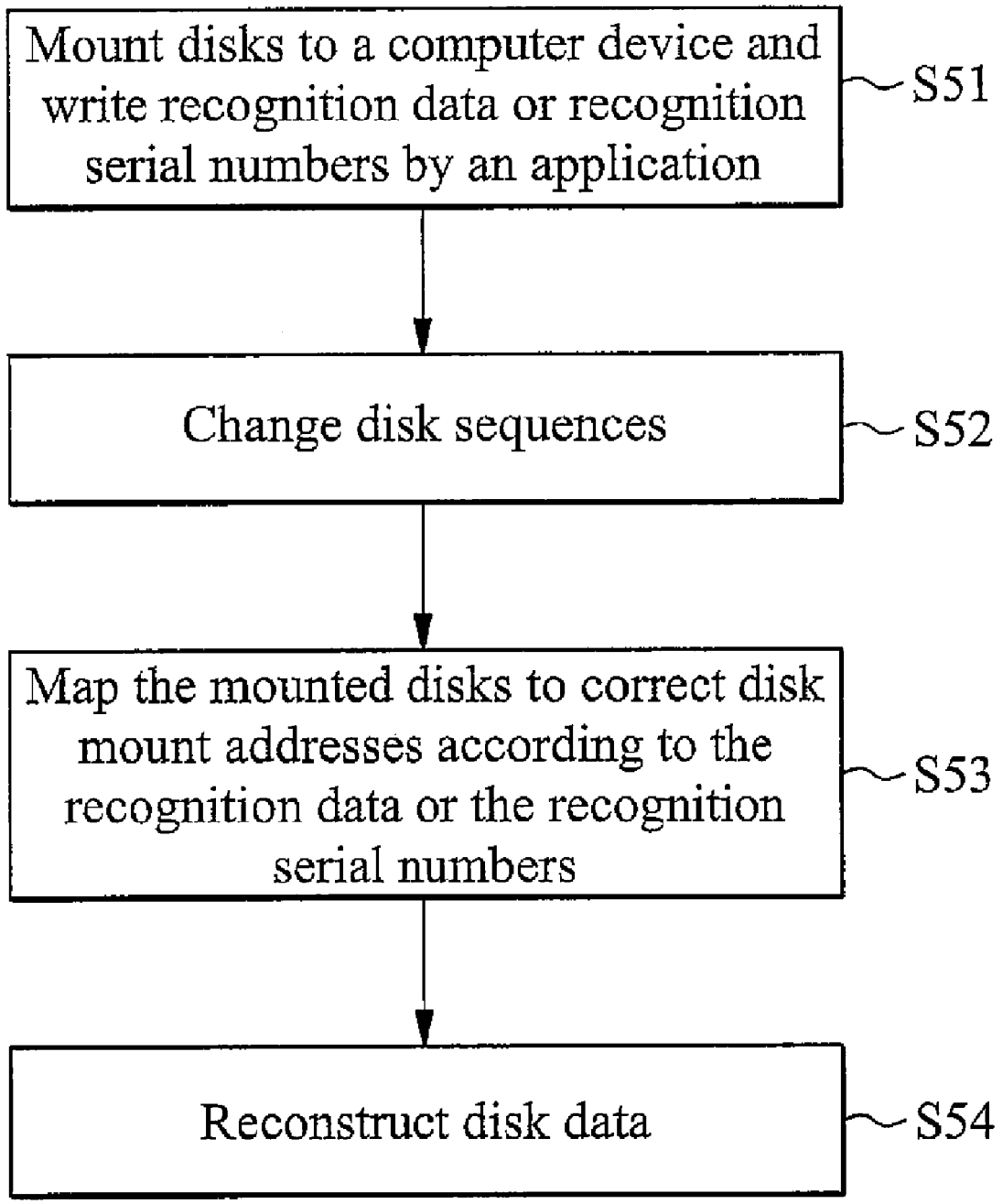
FIG. 5 is a flowchart of the sixth embodiment of a method for reconstructing a RAID system of the present invention.

FIG. 5 is a flowchart of the sixth embodiment of a method for reconstructing a RAID system of the present invention.

When initialized, at least first, second, and third disks are mounted to a computer device, recognition data of each of the first, second, and the third disks is recognized based on disk serial numbers, disk mount addresses, product serial numbers, product types or other recognizable features or recognition serial numbers predefined for each of the first, second, and the third disks are retrieved from a database by an application of a RAID-5 system of the computer device, and the recognition data or the recognition serial numbers are respectively written in the first, second, and the third disks (step S51). When any one or more than one of the first, second, and the third disks are removed from the computer device and then the removed disks are mounted to the computer device based on random disc sequences (as shown by the disks 310 and 350 in Fig. B) (step S52), the mounted disks are mapped to correct disk mount addresses according to the recognition data or the recognition serial numbers (step S53) to recombine data of the first, second, and the third disks using the RAID-5 system s (step S54).

Methods and systems of the present disclosure, or certain aspects or portions of embodiments thereof, may take the form of a program code (i.e., instructions) embodied in media, such as floppy diskettes, CD-ROMS, hard drives, firmware, or any other machine-readable storage medium, wherein, when the program code is loaded into and executed by a machine, such as a computer, the machine becomes an apparatus for practicing embodiments of the disclosure. The methods and apparatus of the present disclosure may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for reconstructing a RAID-5 (Redundant Array of Independent Disks) system, comprising:
    correlating plural disks to plural pieces of unique recognition data, where each disk corresponds to one of the recognition data;
    generating a disk profile according to the recognition data using a RAID-5 system, wherein the disk profile comprises a logic section combined with the disks and the logic section respectively corresponds to the recognition data of different disks based on stored data in different disks;
    mounting the disks to a computer device providing the RAID-5 system; and
    mapping the mounted disks to correct disk mount addresses according to the disk profile to reconstruct the stored data of the disks in the computer device.

2. The method as claimed in claim 1, wherein the disk profile is stored in a storage medium of the computer device.

3. The method as claimed in claim 1, wherein the disk profile is stored in each of the disks.

4. The method as claimed in claim 1, wherein the recognition data is generated by one of derived from internal information of the disks, generated by an application, and retrieved from an external database.

5. A system for reconstructing a RAID-5 (Redundant Array of Independent Disks) system, comprising:
    a program code stored on a machine;
    a correlating unit for correlating plural disks to plural pieces of unique recognition data, where each disk corresponds to one of the recognition data;
    a generation unit for generating a disk profile according to the recognition data using a RAID-5 system, wherein the disk profile comprises a logic section combined with the disks and the logic section respectively corresponds to the recognition data of different disks based on stored data in different disks;
    a reconstruction unit for mapping the mounted disks to correct disk mount addresses according to the disk profile to reconstruct the stored data of the disks in a computer device when mounting the disks to the computer device providing the RAID-5 system.

6. The system as in claim 5, wherein the disk profile is stored in a storage medium of the computer device.

7. The system as in claim 5, wherein the disk profile is stored in each of the disks.

8. The system as in claim 5, wherein the recognition data represents one of internal information of the disks, comprising disk serial numbers, disk mount addresses, product serial numbers, and product models.

9. The system as in claim 5, wherein the recognition data is generated using an application and respectively written in the disks.

10. The system as in claim 5, wherein the recognition data is retrieved from an external database.

* * * * *